United States Patent
Ito et al.

(10) Patent No.: US 11,626,615 B2
(45) Date of Patent: Apr. 11, 2023

(54) ALL SOLID BATTERY

(71) Applicant: TAIYO YUDEN CO., LTD., Tokyo (JP)

(72) Inventors: Daigo Ito, Tokyo (JP); Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 211 days.

(21) Appl. No.: 17/110,143

(22) Filed: Dec. 2, 2020

(65) Prior Publication Data

US 2021/0202986 A1 Jul. 1, 2021

(30) Foreign Application Priority Data

Dec. 27, 2019 (JP) .............................. JP2019-238938
Dec. 27, 2019 (JP) .............................. JP2019-239099

(51) Int. Cl.
*H01M 10/0562* (2010.01)
*H01M 10/0525* (2010.01)
*H01M 4/36* (2006.01)
*H01M 4/134* (2010.01)
(Continued)

(52) U.S. Cl.
CPC ....... *H01M 10/0562* (2013.01); *H01M 4/133* (2013.01); *H01M 4/134* (2013.01); *H01M 4/366* (2013.01); *H01M 10/0525* (2013.01); *H01M 2004/027* (2013.01); *H01M 2004/028* (2013.01)

(58) Field of Classification Search
CPC ......... H01M 10/0562; H01M 10/0525; H01M 4/133; H01M 4/134; H01M 4/366; H01M 2004/027; H01M 2004/028
See application file for complete search history.

(56) References Cited

U.S. PATENT DOCUMENTS

| 2007/0042265 A1 | 2/2007 | Tamai et al. ................. 429/162 |
| 2009/0226705 A1* | 9/2009 | Motoki .................... H01G 4/30 428/323 |
| 2019/0341621 A1 | 11/2019 | Masuko et al. ........ H01M 4/628 |

(Continued)

FOREIGN PATENT DOCUMENTS

| JP | 2007-080812 A | 3/2007 |
| WO | WO 2018/181379 A1 | 10/2018 |
| WO | WO-2020184652 A1 * | 9/2020 ........ H01M 10/0562 |

OTHER PUBLICATIONS

Office Action dated Nov. 3, 2022, issued to U.S. Appl. No. 17/108,887.

*Primary Examiner* — Matthew J Merkling
(74) *Attorney, Agent, or Firm* — Stein IP, LLC

(57) ABSTRACT

An all solid battery includes a multilayer chip in which each of a plurality of solid electrolyte layers including solid electrolyte and each of a plurality of internal electrodes including an electrode active material are alternately stacked, the multilayer chip having a rectangular parallelepiped shape, the plurality of internal electrodes being alternately exposed to two side faces of the multilayer chip other than two end faces of a stacking direction of the multilayer chip, and a pair of external electrodes that contacts the two side faces. At least one of the pair of external electrodes includes an electrode active material of which a pole is a same as that of an electrode active material of the internal electrode which contacts the one of the pair of external electrodes.

13 Claims, 9 Drawing Sheets

(51) Int. Cl.
*H01M 4/133* (2010.01)
*H01M 4/02* (2006.01)

(56) References Cited

U.S. PATENT DOCUMENTS

| | | | |
|---|---|---|---|
| 2020/0303780 A1 | 9/2020 | Baba | |
| 2021/0111425 A1* | 4/2021 | Kim | H01M 10/0562 |
| 2021/0351435 A1* | 11/2021 | Koga | H01M 10/0585 |
| 2021/0367270 A1* | 11/2021 | Oh | H01M 10/0525 |
| 2022/0029169 A1* | 1/2022 | Tanaka | H01M 4/70 |

* cited by examiner

ALL SOLID BATTERY

CROSS-REFERENCE TO RELATED APPLICATION

This application is based upon and claims the benefit of priority of the prior Japanese Patent Application No. 2019-239099, filed on Dec. 27, 2019 and Japanese Patent Application No. 2019-238938, filed on Dec. 27, 2019, the entire contents of which are incorporated herein by reference.

FIELD

A certain aspect of the present invention relates to an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed.

There is disclosed a multilayer type all solid battery in which two or more cell units (unit cells) are stacked for the purpose of achieving high energy density in the field of the all solid battery (for example, see Japanese Patent Application Publication No. 2007-80812 and International Publication No. 2018/181379).

SUMMARY OF THE INVENTION

Improvement of cell capacity of the multilayer type all solid battery is requested. However, it is difficult to improve the cell capacity with the above-mentioned technology.

According to an aspect of the present invention, there is provided an all solid battery including: a multilayer chip in which each of a plurality of solid electrolyte layers including solid electrolyte and each of a plurality of internal electrodes including an electrode active material are alternately stacked, the multilayer chip having a rectangular parallelepiped shape, the plurality of internal electrodes being alternately exposed to two side faces of the multilayer chip other than two end faces of a stacking direction of the multilayer chip; and a pair of external electrodes that contacts the two side faces, wherein at least one of the pair of external electrodes includes an electrode active material of which a pole is a same as that of an electrode active material of the internal electrode which contacts the one of the pair of external electrodes.

According to another aspect of the present invention, there is provided an all solid battery including; a multilayer chip in which each of a plurality of solid electrolyte layers including solid electrolyte and each of a plurality of internal electrodes including an electrode active material are alternately stacked, the multilayer chip having a rectangular parallelepiped shape, the plurality of internal electrodes being alternately exposed to two side faces of the multilayer chip other than two end faces of a stacking direction of the multilayer chip; and a pair of external electrodes that contacts the two side faces, wherein at least one of the pair of external electrodes generates cell capacity during discharge and charge.

DETAILED DESCRIPTION

A description will be given of an embodiment with reference to the accompanying drawings.

Figure 1:
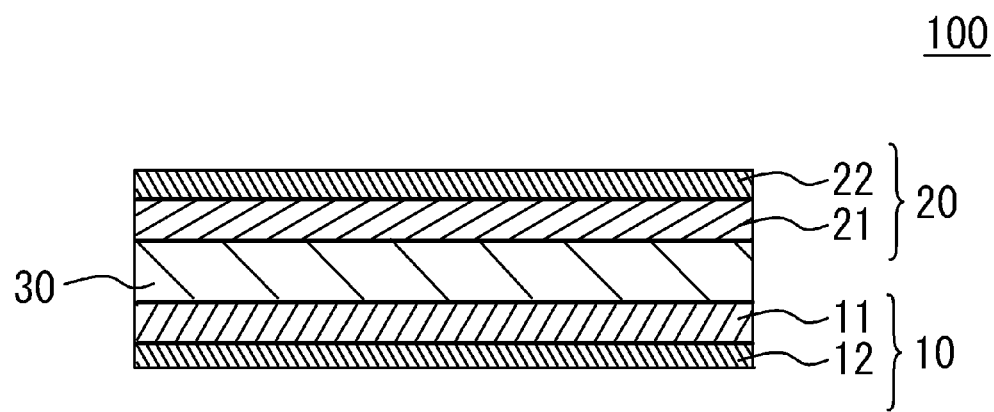
FIG. 1 illustrates a schematic cross section of a basic structure of an all solid battery.

(Embodiment) FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The first internal electrode 10 has a structure in which a first internal electrode layer 11 and a first electric collector layer 12 are stacked. The first internal electrode layer 11 is on the solid electrolyte layer 30 side. The second internal electrode 20 is provided on a second main face of the solid electrolyte layer 30. The second internal electrode 20 has a structure in which a second internal electrode layer 21 and a second electric collector layer 22 are stacked. The second internal electrode layer 21 is on the solid electrolyte layer 30 side.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is solid electrolyte having ionic conductivity. The solid electrolyte of the solid electrolyte layer 30 is an oxide-based solid electrolyte having lithium ion conductivity. The solid electrolyte is phosphoric acid salt-based electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first internal electrode layer 11 and the second internal electrode layer 21 is added in advance, is used. For example, when the first internal electrode layer 11 and the second internal electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first internal electrode layer 11 and the second internal electrode layer 21 include phosphoric acid salt including Li and a transition metal other than Co, it is preferable that the solid electrolyte layer 30 includes Li—Al—Ge—$PO_4$-based material in which the transition metal is added in advance.

At least, the first internal electrode layer 11 used as a positive electrode includes a material having an olivine type crystal structure, as an electrode active material. It is preferable that the second internal electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first internal electrode layer 11 acting as a positive electrode. For example, when only the first internal electrode layer 11 includes the electrode active material having the olivine type crystal structure, the electrode active material acts as the positive electrode active material. When the second internal electrode layer 21 also includes an electrode active material having the olivine type crystal structure, discharge capacity may increase and an operation voltage may increase because of electric discharge, in the second internal electrode layer 21 acting as a negative electrode. The function mechanism is not completely clear. However, the mechanism may be caused by partial solid-phase formation together with the negative electrode active material.

When both the first internal electrode layer 11 and the second internal electrode layer 21 include an electrode active material having the olivine type crystal structure, the electrode active material of each of the first internal electrode layer 11 and the second internal electrode layer 21 may have a common transition metal. Alternatively, the a transition metal of the electrode active material of the first internal electrode layer 11 may be different from that of the second internal electrode layer 21. The first internal electrode layer 11 and the second internal electrode layer 21 may have only single type of transition metal. The first internal electrode layer 11 and the second internal electrode layer 21 may have two or more types of transition metal. It is preferable that the first internal electrode layer 11 and the second internal electrode layer 21 have a common transition metal. It is more preferable that the electrode active materials of the both electrode layers have the same chemical composition. When the first internal electrode layer 11 and the second internal electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode layer 11 and the second internal electrode layer 21, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent. For example, the solid electrolyte of the first internal electrode layer 11 and the second internal electrode layer 21 may be the same as the main component solid electrolyte of the solid electrolyte layer 30.

A main component of the first electric collector layer 12 and the second electric collector layer 22 is conductive material. For example, the conductive material of the first electric collector layer 12 and the second electric collector layer 22 may be a metal material or a carbon material.

Figure 2:
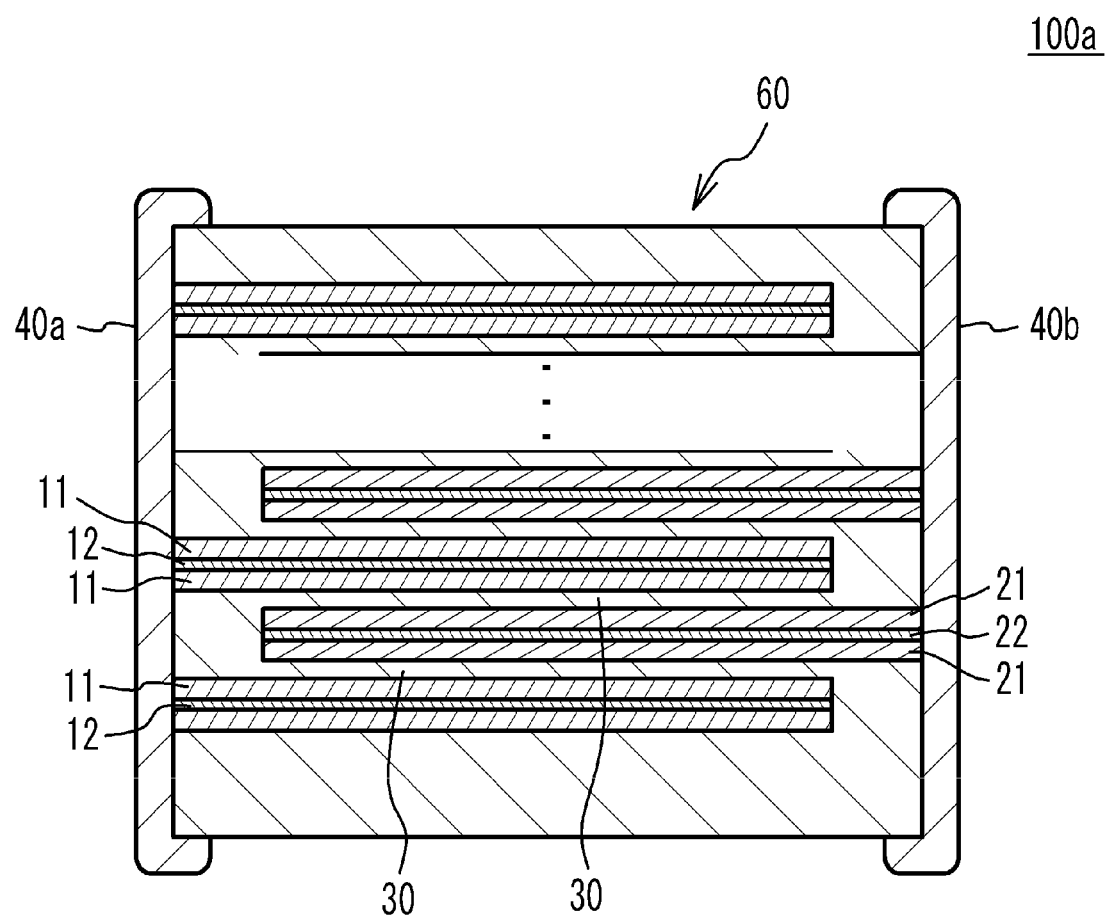
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape. Each of a first external electrode 40a and a second external electrode 40b is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40a is provided on one of the two facing side faces (end faces), and the second external electrode 40b is provided on the other of the two facing side faces.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first internal electrode layer 11 is stacked on the first electric collector layer 12. The solid electrolyte layer 30 is stacked on the first internal electrode layer 11. The solid electrolyte layer 30 extends from the first external electrode 40a to the second external electrode 40b. The second internal electrode layer 21 is stacked on the solid electrolyte layer 30. The second electric collector layer 22 is stacked on the second internal electrode layer 21. Another second internal electrode layer 21 is stacked on the second electric collector layer 22. Another solid electrolyte layer 30 is stacked on the second internal electrode layer 21. The solid electrolyte layer 30 extends from the first external electrode 40a to the second external electrode 40b. The first internal electrode layer 11 is stacked on the solid electrolyte layer 30. In the all solid battery 100a, the stack units are repeatedly stacked. Therefore, the all solid battery 100a has a structure in which a plurality of cell units are stacked.

The multilayer chip 60 has a structure in which each of internal electrodes and each of solid electrolyte layers are alternately stacked, when the first electric collector layer 12 and two first internal electrode layers 11 sandwiching the first electric collector layer 12 are treated as one internal electrode, and the second electric collector layer 22 and two internal electrode layers 21 sandwiching the second electric collector layer 22 are treated as one internal electrode.

Further improvement of the cell capacity of the all solid battery 100a of multilayer type. And so, the first external electrode 40a and the second external electrode 40b have a structure for generating cell capacity during discharge and charge of the all solid battery 100a.

In concrete, at least one of the first external electrode 40a and the second external electrode 40b include a conductive material and an electrode active material. The conductive material is such as a carbon material, a metal material, an alloy material or the like.

The pole of the electrode active material of the first external electrode 40a is the same as that of the electrode active material of the first internal electrode layer 11. The pole of the electrode active material of the second external electrode 40b is the same as that of the electrode active material of the second internal electrode layers 21. For example, when the first internal electrode layer 11 includes only the positive electrode active material in the positive electrode active material and the negative electrode active material and the second internal electrode layer 21 includes only the negative electrode active material in the positive electrode active material and the negative electrode active material, the first external electrode 40a includes a positive electrode active material and the second external electrode 40b includes a negative electrode active material. When the first internal electrode layer 11 and the second internal electrode layer 21 include both the negative electrode active material and the positive electrode active material, the first external electrode 40a and the second external electrode 40b include both of the negative electrode active material and the positive electrode active material. Alternatively, when the first internal electrode layer 11 and the second internal electrode layer 21 include both of the negative electrode active material and the positive electrode active material, the first external electrode 40a includes only the positive electrode active material in the positive electrode active material and the negative electrode active material and the second external electrode 40b only includes the negative electrode active material in the positive electrode active material and the negative electrode active material.

With the structure, the first external electrode 40a generates a cell capacity having the same pole as that of the first internal electrode layer 11, and the second external electrode 40b generates a cell capacity having the same pole as that of the second internal electrode layer 21, during discharge and charge of the all solid battery 100a. Therefore, the cell capacity of the all solid battery 100a is improved.

It is preferable that the first external electrode 40a and the second external electrode 40b include solid electrolyte having ionic conductivity. This is because when the first external electrode 40a and the second external electrode 40b include the solid electrolyte, an ion conductive path of the first external electrode 40a and the second external electrode 40b is secured in the first external electrode 40a and the second external electrode 40b, and the first external electrode 40a and the second external electrode 40b easily generate the cell capacity. It is preferable that a material acting as a negative electrode active material and acting as solid electrolyte having ionic conductivity as in the case of Li—Al—Ti—$PO_4$-based material is used.

It is preferable that a section including the electrode active material in the first external electrode 40a is between two of the first internal electrode layers 11 next to each other. That is, it is preferable that the section including the electrode active material in the first external electrode 40a is a section contacting to the solid electrolyte layer 30. This is because the solid electrolyte of the solid electrolyte layer 30 secures an ion conduction path.

Similarly, it is preferable that a section including the electrode active material in the second external electrode 40b is between two of the second internal electrode layers 21 next to each other. That is, it is preferable that the section including the electrode active material in the second external electrode 40b is a section contacting to the solid electrolyte layer 30.

When the amount of the electrode active material of the first external electrode 40a and the second external electrode 40b is excessively large, conduction failure may occur between the conductive material of the internal electrode and the external electrode. And, a plated layer may not necessarily be evenly formed during forming of the plated layer out of the external electrode, and conduction failure may occur. On the other hand, when the amount of the electrode active material of the first external electrode 40a and the second external electrode 40b is excessively small, the effect of generating the capacity may get smaller. And so, it is preferable that the concentration of the electrode active material in the first external electrode 40a and the second external electrode 40b is 5 volume % or and 50 volume % or less. It is more preferable that the concentration is 10 volume % or more and 40 volume % or less. It is still more preferable that the concentration is 15 volume % or more and 30 volume or less.

The positive electrode active material of the first external electrode 40a and the second external electrode 40b is phosphoric acid salt including Li, Co, Fe, Mn, or Ni. The negative electrode active material is a compound such as Ti oxide, or phosphoric acid salt including Ti. When the first internal electrode 10 includes the positive electrode active material, it is preferable that the first external electrode 40a includes a similar positive electrode material. When the second internal electrode 20 includes a negative electrode active material, it is preferable that the second external electrode 40b includes a similar negative electrode active material. The first external electrode 40a and the second external electrode 40b may include both of the positive electrode active material and the negative electrode active material. It is preferable that the thickness of the first external electrode 40a and the second external electrode 40b is 0.5 μm or more and 50 μm or less. It is more preferable that the thickness is 1 μm or more and 30 μm or less. It is still more preferable that the thickness is 2 μm or more and 20 μm or less.

High adhesion is achieved between the same type materials. Therefore, when the first external electrode 40a includes the solid electrolyte, the first external electrode 40a achieves favorable adhesion with the solid electrolyte layers 30. In this case, the first external electrode 40a achieves favorable adhesion with the first end face of the multilayer chip 60. Therefore, favorable electrical conduction is achieved between the first external electrode 40a and the first internal electrode layers 11. And, the second external electrode 40b achieves favorable adhesion with the solid electrolyte layers 30. Therefore, favorable electrical conduction is achieved between the second external electrode 40b and the second internal electrode layers 21.

For example, the solid electrolyte of the first external electrode 40a and the solid electrolyte of the second external electrode 40b are oxide-based solid electrolyte. However, it is preferable that the solid electrolyte of the first external electrode 40a and the solid electrolyte of the second external electrode 40b have the same crystal structure as that of the solid electrolyte layer 30, because adhesion between compounds having a similar structure is strong. For example, when the solid electrolyte of the solid electrolyte layer 30 has the NASICON structure, it is preferable that the solid electrolyte of the first external electrode 40a and the solid electrolyte of the second external electrode 40b have the NASICON structure. It is preferable that a part of the elements of the same crystal structures is common with each other. It is more preferable that all elements of the same crystal structures are common with each other. It is still more preferable that the compositions of the same crystal structures are common with each other. For example, when the main component of the solid electrolyte layer 30 is a Li—Al—Ge—PO$_4$-based material, it is preferable that the first external electrode 40a and the second external electrode 40b include a Li—Al—Ge—PO$_4$-based material.

When the first internal electrode layers 11 include solid electrolyte, the solid electrolyte of the first external electrode 40a may have the same crystal structure as that of the solid electrolyte of the first internal electrode layers 11. It is preferable that at least a part of elements of the same crystal structures are common between the first external electrode 40a and the first internal electrode layers 11. It is more preferable that all elements of the same crystal structures are common. It is still more preferable that compositions of the same structure are same as each other.

When the second internal electrode layers 21 include solid electrolyte, the solid electrolyte of the second external electrode 40b may have the same crystal structure as that of the solid electrolyte of the second internal electrode layers 21. It is preferable that at least a part of elements of the same crystal structures are common between the second external electrode 40b and the second internal electrode layers 21. It is more preferable that all elements of the same crystal structures are common. It is still more preferable that compositions of the same structure are same as each other.

Figure 3:
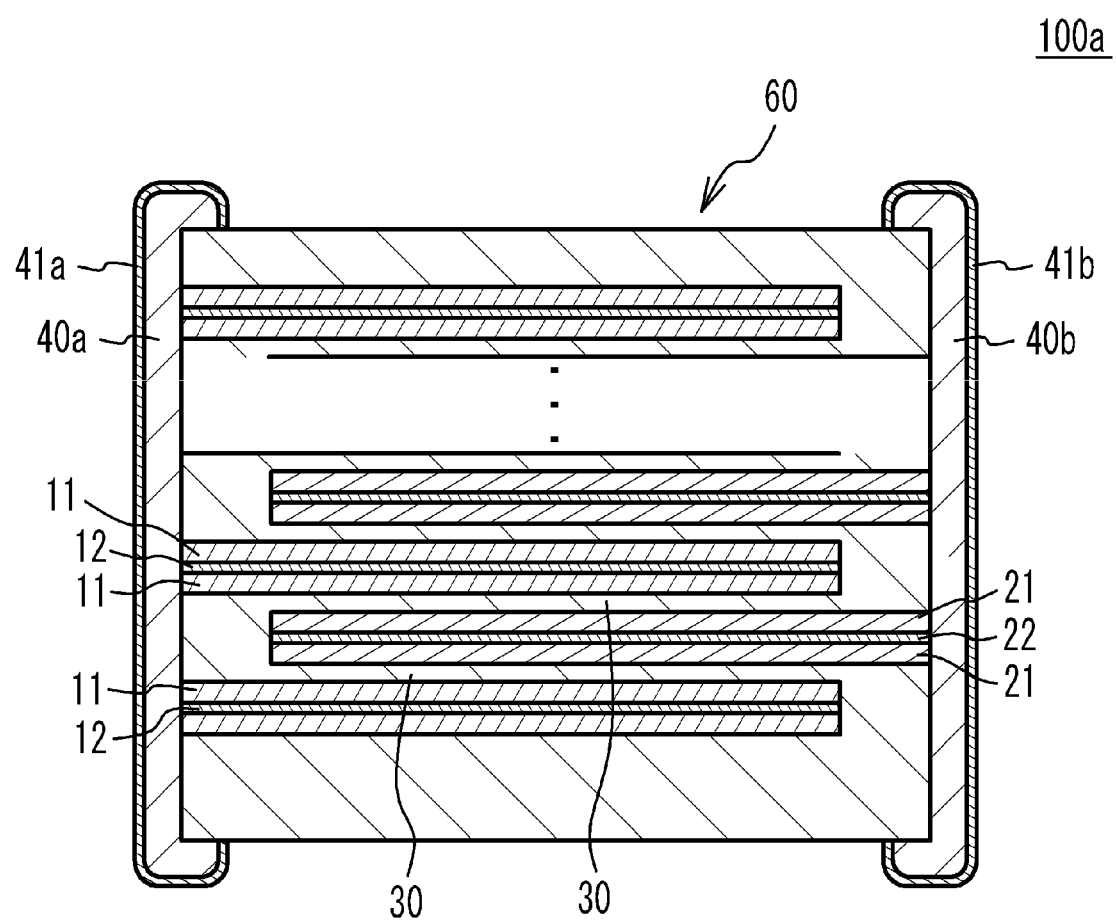
FIG. 3 illustrates a cross section of another all solid battery.

An innermost layer formed on the first end face of the multilayer chip 60 is the first external electrode 40a. Moreover, a plated layer may be provided on an external surface of the first external electrode 40a. And, an innermost layer formed on the second end face of the multilayer chip 60 is the second external electrode 40b. Moreover, a plated layer may be provided on an external surface of the second external electrode 40b. For example, as illustrated in FIG. 3, a plated layer 41a may be provided on the external surface of the first external electrode 40a. A plated layer 41b may be provided on the external surface of the second external electrode 40b. The plated layer 41a and the plated layer 41b have a two-layer structure in which a first layer of plated Ni and a second layer of plated Sn are formed from the inner side.

Figure 4:
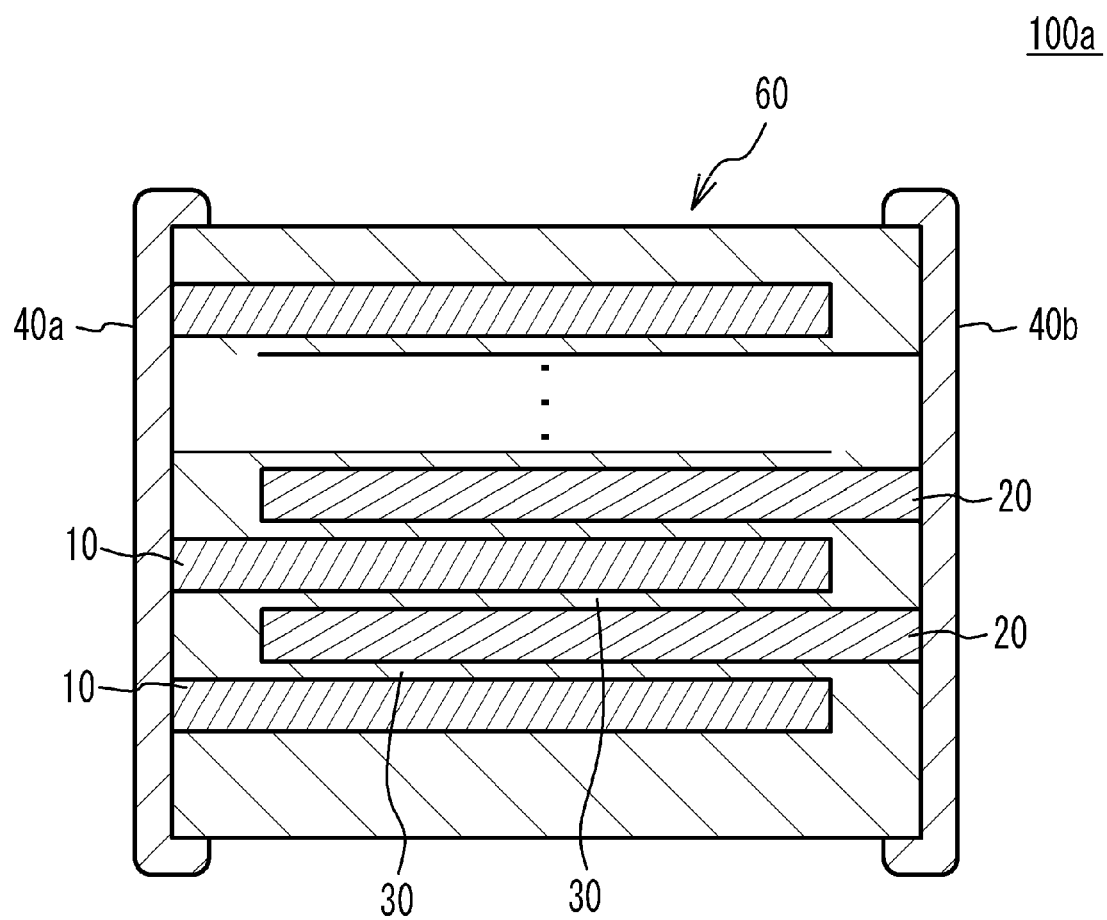
FIG. 4 illustrates a cross section of another all solid battery.

The all solid battery 100a may not necessarily have the electric collector layers. For example, as illustrated in FIG. 4, the first electric collector layers 12 and the second electric collector layers 22 may not necessarily be provided. In this case, the first internal electrode 10 has only the first internal electrode layer 11. And, the second internal electrode 20 has only the second internal electrode layer 21.

(Second embodiment) In the all solid battery 100a of a multilayer type, structural disorder caused by a volume changing of the electrode active material during charging and discharging may be a problem. In concrete, peeling of the first external electrode 40a and the second external electrode 40b from the multilayer chip 60 may be a problem because of the volume changing of the electrode active material. Therefore, it is preferable that the first external electrode 40a and the second external electrode 40b have sufficiently large fixing strength.

And so, the all solid battery 100a of the second embodiment has a structure for securing sufficiently large fixing strength of the first external electrode 40a and the second external electrode 40b. In concrete, the first external electrode 40a and the second external electrode 40b include an electrode active material as a sub component.

A description will be given of a case where the first external electrode 40a includes the electrode active material as the sub component. The electrode active material of the first external electrode 40a includes at least one of metal component elements of the materials in the multilayer chip 60. Moreover, the concentration of the at least one of the metal component elements has a gradient in which the concentration gradually decreases from inside of the multilayer chip 60 to inside of the first external electrode 40a. "gradually decreases" means a case where the concentration gradually decreases, and a case where the concentration repeats up and down and totally decreases toward the first external electrode 40a when the concentration is measured at a plurality of sample points.

Figure 5:
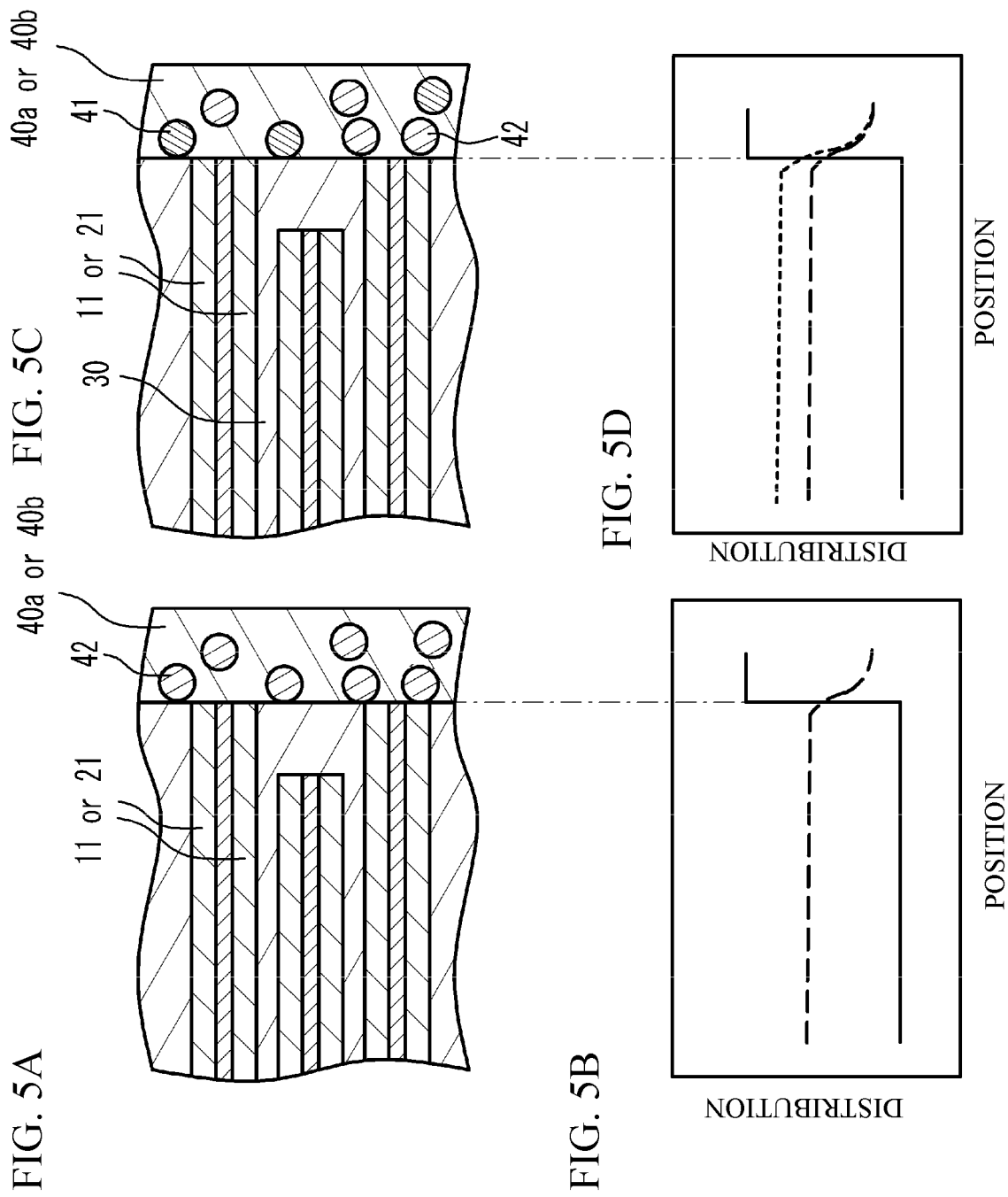
FIG. 5A to FIG. 5D illustrate a sun component.

For example, as illustrated in FIG. 5A, the first external electrode 40a includes an electrode active material 42 which includes the same metal component element as at least one of metal component elements of the electrode active material of the first internal electrode layer 11. For example, when the electrode active material of the first internal electrode layer 11 is a Li—Co—PO$_4$-based material, the electrode active material 42 is also a Li—Co—PO$_4$-based material. As indicated by a broken line of FIG. 5B, the concentration of at least one of common metal component elements between the electrode active material of the first internal electrode layer 11 and the electrode active material 42 gradually decreases from the multilayer chip 60 toward the first external electrode 40a. For example, as an example, the concentration of Co gradually decreases from the inside of the multilayer chip 60 to inside of the first external electrode 40a. In FIG. 5B, the concentration of the conductive material of the first external electrode 40a and the second external electrode 40b is illustrated with a solid line.

Next, a description will be given of a case where the second external electrode 40b includes the electrode active material as the sub component. The electrode active material of the second external electrode 40b includes at least one of metal component elements of the materials in the multilayer chip 60. Moreover, the concentration of the at least one of the metal component elements has a gradient in which the concentration gradually decreases from inside of the multilayer chip 60 to inside of the second external electrode 40b. "gradually decreases" means a case where the concentration gradually decreases, and a case where the concentration repeats up and down and totally decreases toward the second external electrode 40b when the concentration is measured at a plurality of sample points.

For example, as illustrated in FIG. 5A, the second external electrode 40b includes the electrode active material 42 which includes the same metal component element as at least one of metal component elements of the electrode active material of the second internal electrode layer 21. For example, when the electrode active material of the second internal electrode layer 21 is a Li—Al—Ti—PO$_4$-based material, the electrode active material 42 is also a Li—Al—Ti—PO$_4$-based material. As indicated by a broken line of FIG. 5B, the concentration of at least one of common metal component elements between the electrode active material of the second internal electrode layer 21 and the electrode active material 42 gradually decreases from the multilayer chip 60 toward the second external electrode 40b. For example, as an example, the concentration of Ti gradually decreases from the inside of the multilayer chip 60 to inside of the second external electrode 40b.

Next, a description will be given of a case where the first external electrode 40a includes a solid electrolyte 41 and the electrode active material 42 illustrated in FIG. 5C. In this case, as indicated with a dotted line of FIG. 5D, the concentration of at least one of common metal component elements between the solid electrolyte of the solid electrolyte layer 30 and the solid electrolyte 41 gradually decreases from the multilayer chip 60 toward the first external electrode 40a. As indicated with a broken line of FIG. 5D, the concentration of at least one of common metal component elements between the electrode active material of the first internal electrode layer 11 and the electrode active material 42 gradually decreases from the multilayer chip 60 toward the first external electrode 40a.

Next, a description will be given of a case where the second external electrode 40b includes the solid electrolyte 41 and the electrode active material 42. As indicated with a dotted line of FIG. 5D, the concentration of at least one of common metal component elements between the solid electrolyte of the solid electrolyte layer 30 and the solid electrolyte 41 gradually decreases from the multilayer chip 60 toward the second external electrode 40b. As indicated with a broken line of FIG. 5D, the concentration of at least one of common metal component elements between the electrode active material of the second internal electrode layer 21 and the electrode active material 42 gradually decreases from the multilayer chip 60 toward the second external electrode 40b. In FIG. 5D, the concentration of the conductive material of the first external electrode 40a and the second external electrode 40b is illustrated with a solid line.

In this manner, the solid electrolyte and the electrode active material of the first external electrode 40a and the second external electrode 40b include the same metal component element as at least one of metal component elements of the multilayer chip 60, and the concentration of the same metal component element gradually decreases from inside of the multilayer chip 60 to inside of the first external electrode 40a and the second external electrode 40b. Therefore, a clear interface is hardly formed between the multilayer chip 60, and the first external electrode 40a and the second external electrode 40b. Therefore, the fixing strength of the first external electrode 40a and the second external electrode 40b against the multilayer chip 60 is improved. And, sufficiently large fixing strength is obtained. Thus, the peeling of the first external electrode 40a and the second external electrode 40b is suppressed. And, it is possible to reduce the inner resistance of the all solid battery 100a.

The solid electrolyte and the electrode active material of the first external electrode 40a and the second external electrode 40b include the same metal component element as at least one of the metal component elements of the multilayer chip 60. Therefore, the material composition gap in the multilayer chip 60 is suppressed. In concrete, the material composition gap of the solid electrolyte layer 30, the first internal electrode layer 11 and the second internal electrode layer 21 is suppressed. Thus, the degradation of the cell characteristic or the like is suppressed. Therefore, reduction of the cell capacity is suppressed.

It is preferable that the solid electrolyte and the electrode active material of the first external electrode 40a and the second external electrode 40b include the same metal component elements of the solid electrolyte and the electrode active material of the multilayer chip 60. It is preferable that the composition of the solid electrolyte and the electrode active material of the first external electrode 40a and the second external electrode 40b are the same as the composition of the solid electrolyte and the electrode active material of the multilayer chip 60.

It is possible to measure the concentration of each component of the solid electrolyte and the electrode active material of the first external electrode 40a and the second external electrode 40b, with use of a laser ablation ICP (Inductive Coupled Plasma) mass spectroscopy or the like.

When the plated layer 41a and the plated layer 41b are provided, it is preferable that an amount of a component impeding the plating at the surface of the first external electrode 40a and the second external electrode 40b is small. And so, it is preferable that the concentration of the sub component (the electrode active material) at the external surface of the first external electrode 40a and the second external electrode 40b is smaller than the concentration at the interface between the multilayer chip 60, and the first external electrode 40a and the second external electrode 40b. For example, the concentration of the sub component gradually decreases from the multilayer chip 60 toward the first external electrode 40a and the second external electrode 40b, and the concentration does not increase toward the surface of the first external electrode 40a and the second external electrode 40b. In this case, the amount of the sub component is small at the surface of the first external electrode 40a and the second external electrode 40b. Therefore, impeding of the plating is suppressed.

Figure 6:
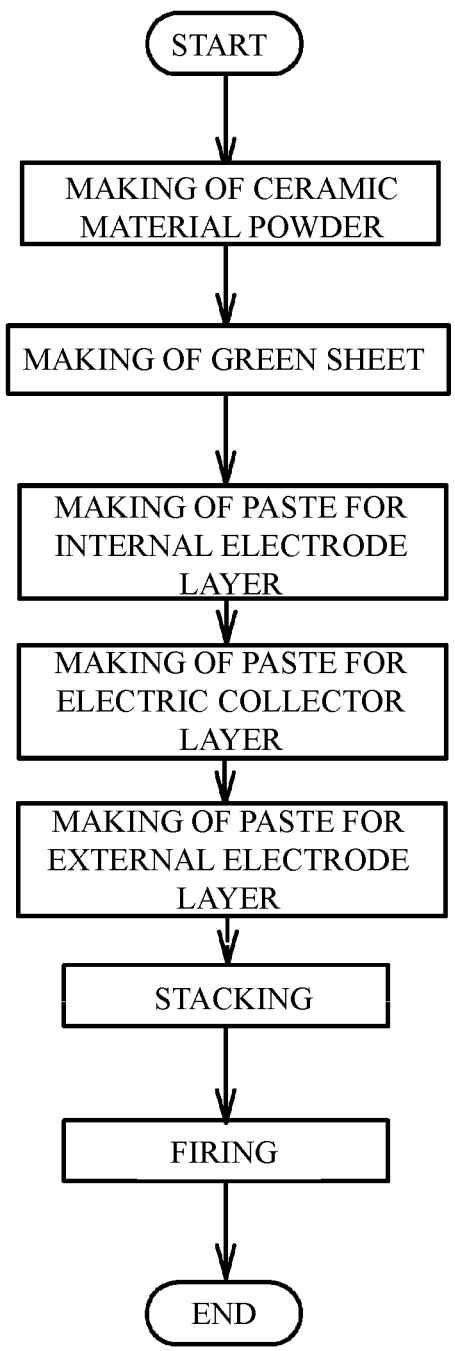
FIG. 6 illustrates a flowchart of a manufacturing method of an all solid battery.

A description will be given of a manufacturing method of the all solid battery 100a described in FIG. 2. FIG. 6 illustrates a flowchart of the manufacturing method of the all solid battery 100a.

(Making process of ceramic material powder) Powder of solid electrolyte for the solid electrolyte layer 30 is made. For example, it is possible to make the solid electrolyte powder, by mixing raw material and additives and using solid phase synthesis method or the like. The resulting powder is subjected to dry grinding. Thus, a grain diameter of the resulting power is adjusted to a desired one. For example, it is possible to adjust the grain diameter to the desired diameter with use of planetary ball mill using $ZrO_2$ ball of 5 mm.

The additive includes sintering assistant. The sintering assistant includes one or more of glass components such as Li—B—O-based compound, Li—Si—O-based compound, Li—C—O-based compound, Li—S—O-based compound and Li—P—O-based compound.

(Making process of green sheet) The resulting powder is evenly dispersed into aqueous solvent or organic solvent together with a binding agent, a dispersing agent, a plasticizer and so on. The resulting powder is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

(Making process of paste for internal electrode) Next, paste for internal electrode is made in order to make the first internal electrode layer 11 and the second internal electrode layer 21. For example, a conductive auxiliary agent, an active material, a solid electrolyte material, a binder, a plasticizer and so on are evenly dispersed into water or organic solvent. Thus, paste for internal electrode layer is obtained. The above-mentioned solid electrolyte paste may be used as the solid electrolyte material. Pd, Ni, Cu, Fe, or alloy thereof, or a carbon material may be used as the conductive auxiliary agent. When the composition of the first internal electrode layer 11 is different from that of the second internal electrode layer 21, paste for internal electrode used for the first internal electrode layer 11 and another paste for internal electrode used for the second internal electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing Pd powder, carbon black, board-shaped graphite carbon, a binder, dispersant, plasticizer and so on into water or organic solvent.

(Making process of paste for external electrode) Next, paste for external electrode is made in order to make the first external electrode 40a and the second external electrode 40b. It is possible to make the paste for external electrode, by evenly dispersing conductive auxiliary agent, an electrode active material, solid electrolyte, a binder, plasticizer and so on into water or organic solvent.

Figure 7A:
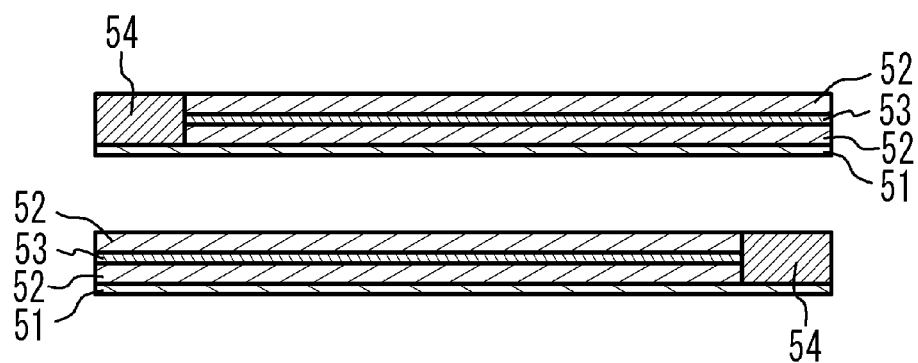
FIG. 7A and FIG. 7B illustrate a stacking process.
Figure 7B:
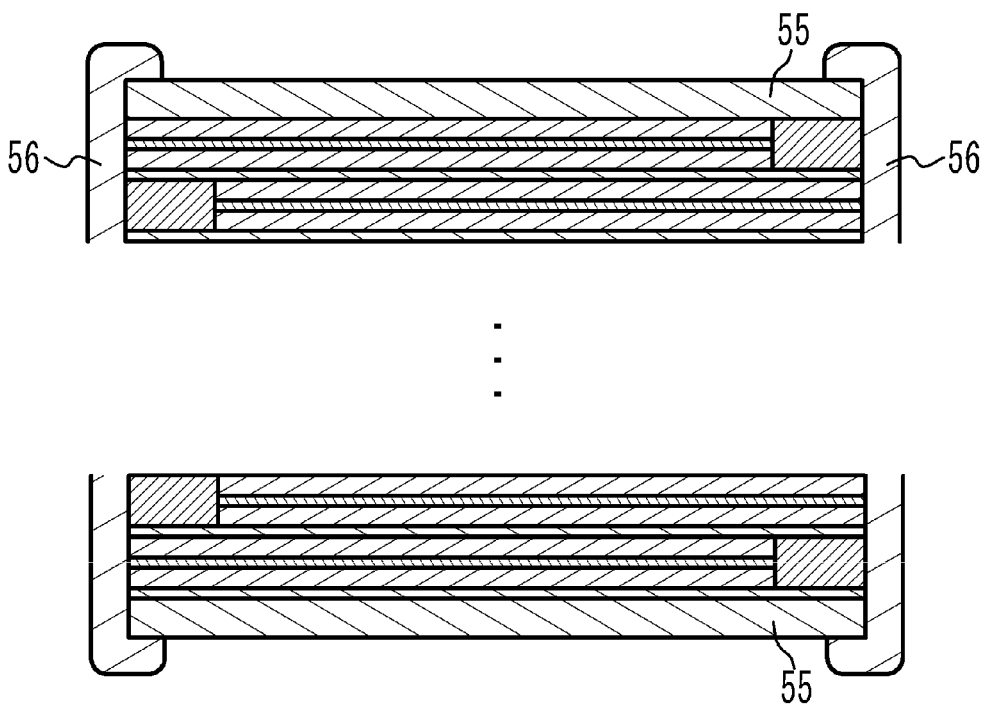

(Stacking process) Paste 52 for internal electrode is printed on one face of a green sheet 51 as illustrated in FIG. 7A. Paste 53 for electric collector is printed on the paste 52 for electrode layer. And, another paste 52 for internal electrode is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. As illustrated in FIG. 7B, cover sheets 55 in which a plurality of solid electrolyte green sheets are stacked are crimped from an upper side and a lower side of the stacking direction. Thus, a multilayer structure is obtained. In this case, in the multilayer structure, a pair of the paste 52 for internal electrode and the paste 53 for electric collector are alternately exposed to the two end faces Next, the two end faces are coated with paste 56 for external electrode by dipping method or the like. After that, the paste 56 for external electrode is dried. Thus, a compact for forming the all solid battery 100a is obtained.

(Firing process) Next, the multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the all solid battery 100 or the all solid battery 100a is manufactured.

With respect to the all solid battery 100a illustrated in FIG. 3, the first external electrode 40a and the second external electrode 40b formed by firing the paste for external electrode are used as base layers. When base layers are subjected to plating, the plated layers 41a and 41b are formed.

With respect to the all solid battery 100a illustrated in FIG. 4, the process for painting the paste 53 for electric collector may be omitted in FIG. 7A.

Figure 8:
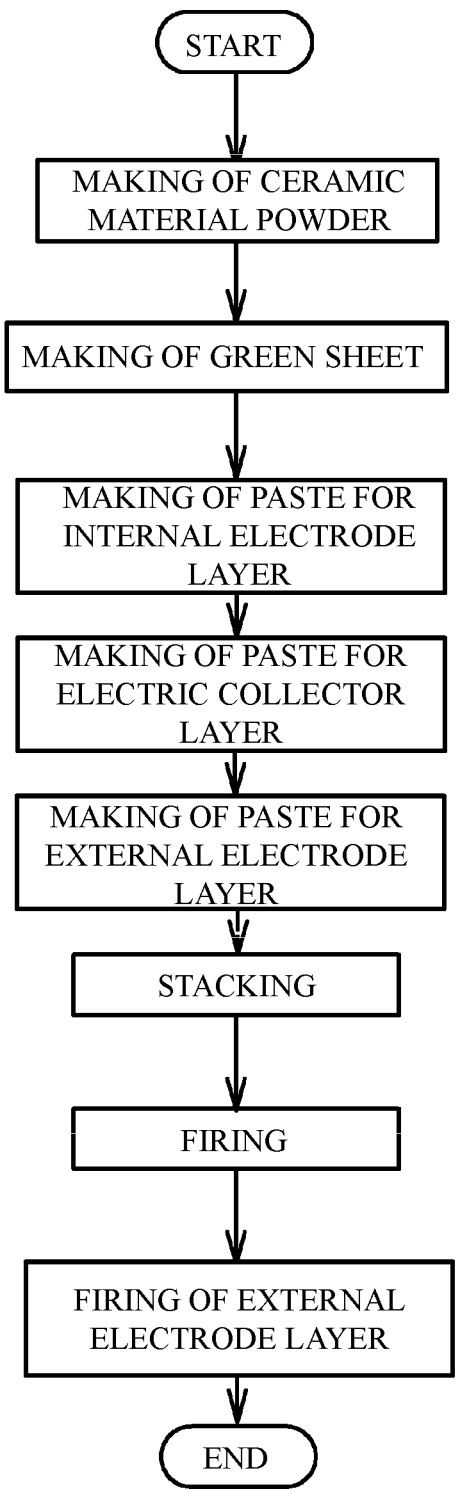
FIG. 8 illustrates another flowchart of a manufacturing method of an all solid battery.

The first external electrode 40a and the second external electrode 40b may be fired after the firing process. FIG. 8 illustrates a manufacturing method. For example, the two end faces of the multilayer chip formed by the firing process are coated with the paste 56 for external electrode without painting the paste 56 for external electrode in the stacking process. And, the paste 56 for external electrode is fired. Thus, it is possible to form the first external electrode 40a and the second external electrode 40b.

EXAMPLES

The all solid batteries in accordance with the embodiment were made and the property was measured.

(Example 1) $Co_3O_4$, $Li_2CO_3$, dihydrogen phosphate ammonium, $Al_2O_3$, $GeO_2$ were mixed and were used as solid electrolyte material powder. From the solid electrolyte material powder, $Li_{1.3}Al_{0.3}Ge_{1.7}(PO_4)_3$ including a predetermined amount of Co was made by a solid phase synthesizing. The resulting power was dry-crushed by $ZrO_2$ balls. Moreover, the resulting powder was wet-crushed (dispersing medium: ion exchange water or ethanol). Thus, solid electrolyte slurry was made. Solid electrolyte paste was obtained by adding a binder to the resulting slurry. And, solid electrolyte green sheet was made. $Li_{1.3}Al_{0.3}Ti_{1.7}(PO_4)_3$ including a predetermined amount of $LiCoPO_4$ and Co was synthesized by a solid phase synthesizing as well as the above-mentioned oxide.

The resulting electrode active material and the solid electrolyte material were highly dispersed with use of wet-bead mill. Thus, ceramic paste including only ceramic grains was made. Next, the ceramic paste and the conductive auxiliary agent were mixed Thus, paste for internal electrode was made. As the positive electrode active material, $LiCoPO_4$ and Li—Al—Ge—$PO_4$-based material were added to the paste for the positive electrode. As the negative electrode active material, Li—Al—Ti—PO$_4$-based material was added to the negative electrode material.

Composite of the conductive carbon, the Li—Al—Ge—PO$_4$-based material acting as the solid electrolyte, the LiCoPO$_4$ acting as the positive electrode active material was made as the paste for the positive external electrode. Composite of the conductive carbon, the Li—Al—Ti—PO$_4$-based material acting as the negative electrode active material was made as the paste for the negative external electrode. The Li—Al—Ti—PO$_4$-based material also acts as the solid electrolyte having ionic conductivity.

Paste for positive internal electrode was printed on the solid electrolyte green sheet, with use of a screen having a predetermined pattern. And, as paste for electric collector, Pd paste was printed on the paste for positive internal electrode. And, paste for positive internal electrode was printed on the paste for electric collector. Paste for negative internal electrode was printed on the solid electrolyte green sheet, with use of a screen having a predetermined pattern. And, as paste for electric collector, Pd paste was printed on the paste for negative internal electrode. And, paste for negative internal electrode was printed on the paste for electric collector. 10 numbers of the green sheets after the printing were stacked so that each of the electrodes is alternately shifted to right and left. Cover sheets in which solid electrolyte green sheets were stacked were adhered to an upper face and a lower face of the multilayer structure of the stacked green sheets after the printing. The cover sheets were crimped to the multilayer structure by a heating pressurizing press. The resulting multilayer structure was stamped into a predetermined size by a dicer. Thus, a multilayer structure having a rectangular parallelepiped shape was obtained. One of end faces of the resulting multilayer structure to which the paste for positive internal electrode was exposed were coated with the paste for positive external electrode by a dipping method or the like. The other of the end faces of the resulting multilayer structure to which the paste for negative internal electrode was exposed were coated with the paste for negative external electrode by a dipping method or the like. After that, the paste for positive external electrode and the paste for negative external electrode were dried. After that, the binder was removed by a thermal treatment of 300 degrees C. or more and 500 degrees C. or less. And, the resulting multilayer structure was subjected to a thermal treatment of 900 degrees C. or less. In the thermal treatment, each compound was sintered. Thus, a sintered structure was obtained.

(Comparative example 1) In the comparative example 1, composite of conductive carbon and a Li—Al—Ge—PO$_4$-based material was made, as the paste for external electrode. The paste for external electrode was used as both of the paste for positive external electrode and the paste for negative external electrode. The electrode active material was not added to the paste for external electrode. The two end faces of the multilayer structure was coated with the paste for external electrode by a dipping method, and was dried. Other conditions were the same as those of the example 1.

With respect to each sample of the example 1 and the comparative example 1, it was confirmed whether the external electrode was peeled or not. And, an initial capacity was measured, with respect to each sample of the example 1 and the comparative example 1. Table 1 shows the results. As the initial capacity of the example 1, a ratio of the initial capacity of the example 1 with respect to the initial capacity of the comparative example 1 was measured on a presumption that the initial capacity of the comparative example 1 was "1". The all solid battery of the comparative example 1 was charged at a room temperature or less, with use of a constant current (0.2 C) which achieves full charge for 5 hr. After rest for 30 seconds, the capacity when the all solid battery was discharged with use of the constant current to 0 V was measured as the initial capacity. In the example 1, the all solid battery was charged and discharged as well as the comparative example 1.

TABLE 1

| | PEELING OF EXTERNAL ELECTRODE | INITIAL CAPACITY |
|---|---|---|
| EXAMPLE 1 | NOT PEELED | 1.05 |
| COMPARATIVE EXAMPLE 1 | NOT PEELED | 1 |

With respect to the comparative example 1, the same initial capacity was obtained as that of a case where an external electrode was formed by Au sputtering after firing a multilayer structure of a solid electrolyte green sheet, paste for internal electrode and paste for electric collector layer. With respect to the example 1, the initial capacity was larger than that of the comparative example 1, by 5%. It is thought that this was because the electrode active material was added to the paste for external electrode, the external electrode included the electrode active material, and the external electrode generates the capacity. With respect to the example 1, peeling of the external electrode was not confirmed. It is thought that this was because the solid electrolyte was added to the external electrode, and the adhesion between the external electrode and the solid electrolyte was improved.

(Example 2) Li$_{1.3}$Al$_{0.3}$Ti$_{1.7}$(PO$_4$)$_3$ including a predetermined amount of LiCoPO$_4$ and Co was synthesized by the solid phase synthesis method. The LiCoPO$_4$ material and the Li—Al—Ti—PO$_4$-based material were highly dispersed by a wet bead mil or the like. And, ceramic paste including only ceramic particles was made. Next, the ceramic paste and the conductive material were sufficiently mixed with each other. Thus, the paste for internal electrode was made.

Composite of the conductive carbon and the sub component was made as the paste for external electrode. The Li—Al—Ge—PO$_4$-based material acting as the solid electrolyte was used as the sub component. Other conditions were the same as those of the example 1.

(Example 3) As the sub component of the paste for external electrode, a Li—Al—Ti—PO$_4$-based material acting as the electrode active material was used. Other conditions were the same as those of the example 1.

(Example 4) As the sub component of the paste for external electrode, a Li—Al—Ge—PO$_4$-based material acting as the solid electrolyte and a Li—Al—Ti—PO$_4$-based material acting as the negative electrode active material were used. Other conditions were the same as those of the example 1.

(Example 5) As the sub component of the paste for external electrode, a Li—Al—Ge—PO$_4$-based material acting as the solid electrolyte and a Li—Al—Ti—PO$_4$-based material acting as the negative electrode active material were used. A plurality of paste having different sub component concentration were painted. Thus, the concentration distribution different from that of the example 4 was made. Other conditions were the same as those of the example 1.

(Comparative example 2) As the paste for external electrode, composite of the conductive carbon and the glass frit was made. Other conditions were the same as those of the example 1.

Figure 9E:
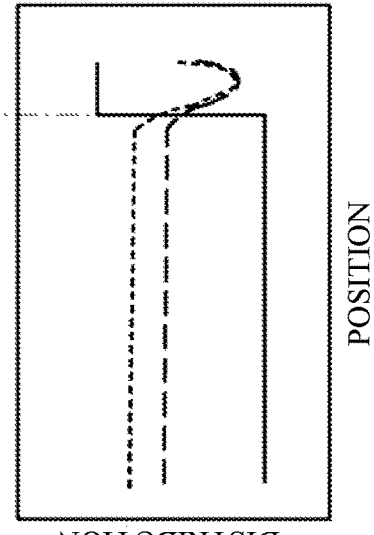
FIG. 9A to FIG. 9F illustrate an example 4 and comparative examples 2 and 3.
Figure 9F:
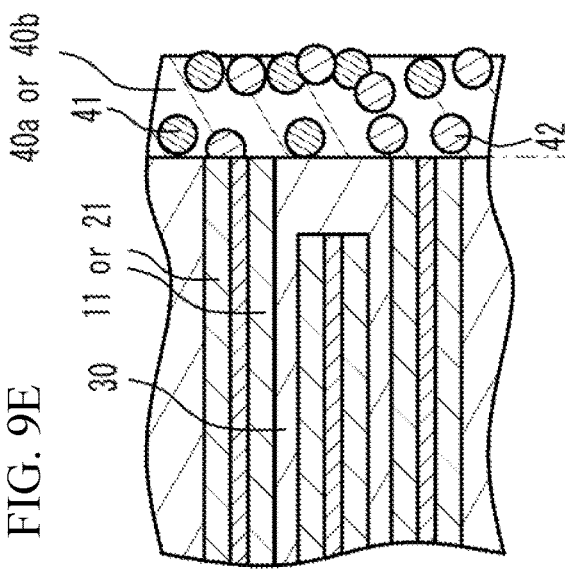
Figure 9C:
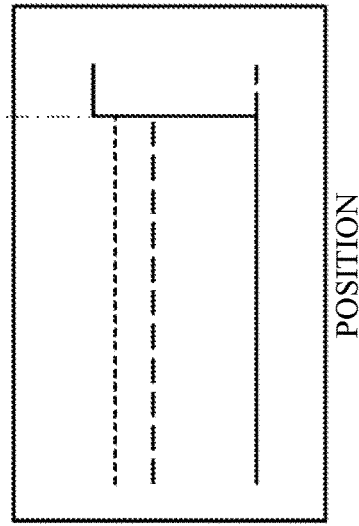
Figure 9D:
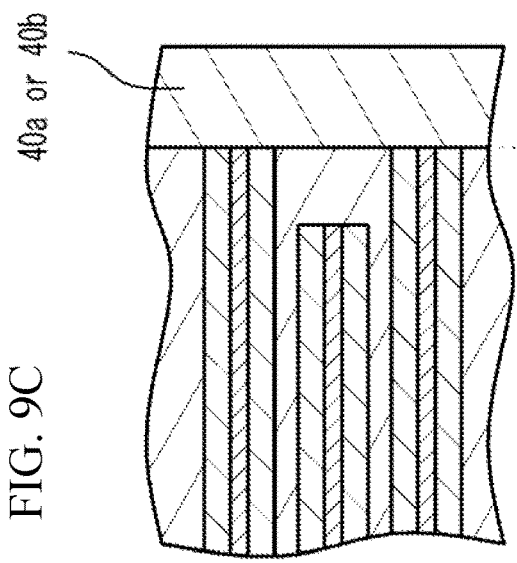

(Comparative example 3) As the paste for external electrode, conductive carbon paste was made. That is, in the comparative example 3, the paste for external electrode included neither the solid electrolyte nor the electrode active material. Other conditions were the same as those of the example 1.

comparative example 3, as illustrated in FIG. 9C and FIG. 9D, the sub component was not added. In FIG. 9D, the dotted line indicates the concentration of the Li—Al—Ge—PO$_4$-based material. The broken line indicates the Li—Al—Ti—PO$_4$-based material. The solid line indicates the concentration of the conductive material.

TABLE 2

| | SUB COMPONENT | DISTRIBUTION OF SUB COMPONENT | INCREASING RATE OF INNER RESISTANCE | DECREASING RATE OF CAPACITY | NG RATE OF PLATING |
|---|---|---|---|---|---|
| EXAMPLE 2 | ELECTROLYTE | DECREASE → CONSTANT | 2% (○) | 95% (○) | 0% |
| EXAMPLE 3 | ACTIVE MATERIAL | DECREASE → CONSTANT | 2% (○) | 95% (○) | 0% |
| EXAMPLE 4 | ELECTROLYTE ACTIVE MATERIAL | DECREASE → CONSTANT | 1% (○) | 95% (○) | 0% |
| EXAMPLE 5 | ELECTROLYTE ACTIVE MATERIAL | DECREASE → INCREASE | 1% (○) | 95% (○) | 3% |
| COMPARATIVE EXAMPLE 2 | GLASS FRIT | INCREASE → CONSTANT | 6% (×) | 80% (×) | 0% |
| COMPARATIVE EXAMPLE 3 | NONE | NONE | 10% (×) | 85% (×) | 0% |

Figure 9A:
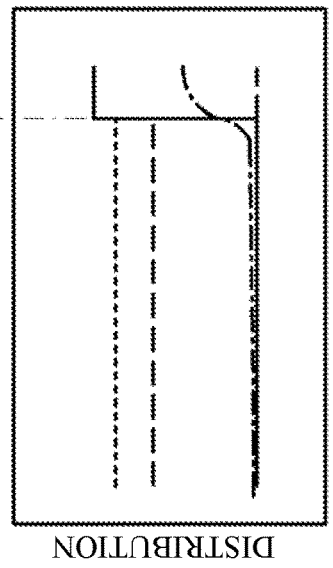
Figure 9B:
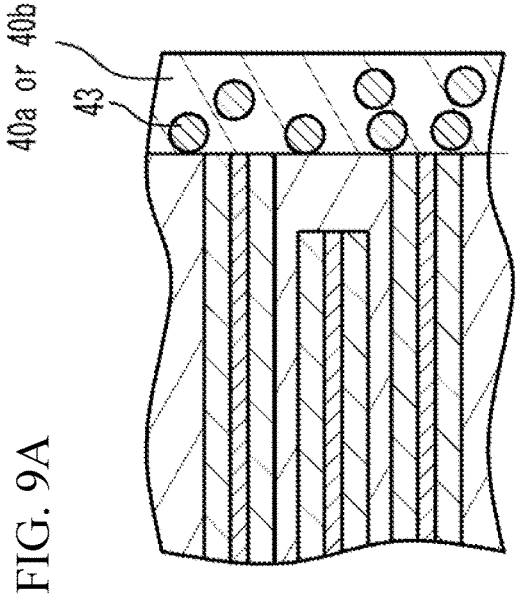

The concentration of the common metal component element between the multilayer chip 60, and the first external electrode 40a and the second external electrode 40b was measured near the interface between the multilayer chip 60, and the first external electrode 40a and the second external electrode 40b. As the measuring method, an laser ablation ICP mass spectroscopy was used. Table 2 shows the results. In the example 2, the concentration of the Li—Al—Ge—PO$_4$-based material gradually decreased and became approximate constant value, from the multilayer chip 60 toward the first external electrode 40a and the second external electrode 40b. In the example 3, the concentration of the Li—Al—Ti—PO$_4$-based material gradually decreased and became approximate constant value, from the multilayer chip 60 toward the first external electrode 40a and the second external electrode 40b. In the example 4, the concentration of the Li—Al—Ge—PO$_4$-based material and the concentration of the Li—Al—Ti—PO$_4$-based material gradually decreased and became approximate constant value, from the multilayer chip 60 toward the first external electrode 40a and the second external electrode 40b. In the example 5, as illustrated in FIG. 9E and FIG. 9F, the concentration of the Li—Al—Ge—PO$_4$-based material and the concentration of the Li—Al—Ti—PO$_4$-based material gradually decreased and gradually increased from the multilayer chip 60 toward the first external electrode 40a and the second external electrode 40b, and became high at the surface of the first external electrode 40a and the second external electrode 40b. In FIG. 9F, the dotted line indicates the concentration of the Li—Al—Ge—PO$_4$-based material. The broken line indicates the concentration of the Li—Al—Ti—PO$_4$-based material. The solid line indicates the concentration of the conductive material. In the comparative example 2, as illustrated in FIG. 9A and FIG. 9B, the concentration of a glass frit 43 gradually increased and became approximate constant value, from the multilayer chip 60 toward the first external electrode 40a and the second external electrode 40b. In FIG. 9B, the dashed line indicates the concentration of the glass frit 43. The dotted line indicates the concentration of the Li—Al—Ge—PO$_4$-based material. The broken line indicates the concentration of the Li—Al—Ti—PO$_4$-based material. The solid line indicates the concentration of the conductive material. In the With respect to the examples 2 to 5 and the comparative examples 2 and 3 (the number of samples was 10), the inner resistance and the capacity were measured before 2000-cycle charge and discharge and after the 2000-cycle charge and discharge. When an average inner resistance of a sample increased from the initial value by 5% or more, the sample was determined bad "x". When the average inner resistance of the sample did not increase from the initial value by 5% or more, the sample was determined good "○". When an average capacity of a sample decreased from the initial value by 10% or more, the sample was determined bad "X". When the average capacity of the sample did not decrease from the initial value by 10% or more, the sample was determined good "○".

The increasing rate of the inner resistance was determined as good, with respect to the examples 2 to 5. It is thought that this was because the concentration of the sub component gradually decreased from the multilayer chip 60 toward the first external electrode 40a and the second external electrode 40b, the fixing strength of the first external electrode 40a and the second external electrode 40b was improved, and the volume changing after the discharge and charge cycle was absorbed. On the other hand, the increasing rate of the inner resistance was determined as bad, with respect to the comparative example 2. It is thought that this was because the concentration of the solid electrolyte and the concentration of the electrode active material rapidly changed between the multilayer chip 60, and the first external electrode 40a and the second external electrode 40b, and a clear interface was made between the multilayer chip 60, and the first external electrode 40a and the second external electrode 40b. The increasing rate of the inner resistance was determined as bad, with respect to the comparative example 3. It is thought that this was because the sub component was not added, a clear interface was made between the multilayer chip 60, and the first external electrode 40a and the second external electrode 40b, and the sufficiently large fixing strength was not achieved in the first external electrode 40a and the second external electrode 40b.

The decreasing rate of the capacity was determined as bad, with respect to the examples 2 to 5. It is thought that this was because diffusion of the same element occurred between the multilayer chip 60, and the first external electrode 40a and the second external electrode 40b, and the material composition gap or the degradation of the cell characteristic was suppressed. On the other hand, the decreasing rate of the capacity was determined as bad, with respect to the comparative examples 2 and 3. It is thought that this was because the material composition gap or the degradation of the cell characteristic occurred because of the diffusion.

With respect to the examples 2 to 5 and the comparative examples 2 and 3, coatability of the plated layer against the first external electrode 40a and the second external electrode 40b was confirmed. The number of samples was 100, with respect to each of the examples 2 to 5 and the comparative examples 2 and 3. External view of the plated layer was confirmed by visual inspection. When the plated layer did not sufficiently cover the surface of the multilayer chip 60, the sample was determined as bad. Table 2 shows the rate of the NG determination. The rate of NG in the plating was 3% with respect to the example 5. It is thought that this was because the amount of the component such as the solid electrolyte and the electrode active material impeding the plating is large at the external surface of the first external electrode 40a and the second external electrode 40b. On the other hand, the rate of NG in the plating was 0%, with respect to the examples 2 to 4. It is thought that the amount of the component impeding the plating such as the solid electrolyte or the electrode active material is small at the external surface of the first external electrode 40a and the second external electrode 40b. From the results, it is preferable that the concentration of the sub component does not increase toward the surface of the first external electrode 40a and the second external electrode from the multilayer chip 60.

Although the embodiments of the present invention have been described in detail, it is to be understood that the various change, substitutions, and alterations could be made hereto without departing from the spirit and scope of the invention.

What is claimed is:

1. An all solid battery comprising:
   a multilayer chip in which each of a plurality of solid electrolyte layers including solid electrolyte and each of a plurality of internal electrodes including an electrode active material are alternately stacked, the multilayer chip having a rectangular parallelepiped shape, the plurality of internal electrodes being alternately exposed to two side faces of the multilayer chip other than two end faces of a stacking direction of the multilayer chip; and
   a pair of external electrodes that contacts the two side faces,
   wherein at least one of the pair of external electrodes includes an electrode active material of which a pole is a same as that of the electrode active material of one of the plurality of internal electrodes which contacts the one of the pair of external electrodes.

2. The all solid battery as claimed in claim 1, wherein in the at least one of the pair of external electrode, a section including the electrode active material is between two of the plurality of internal electrodes next to each other.

3. The all solid battery as claimed in claim 1, wherein each of first internal electrodes including a positive electrode active material and each of second internal electrodes including a negative electrode active material are alternately exposed to the two side faces of the multilayer chip,
   wherein one of the pair of external electrodes connected to the first internal electrode includes a positive electrode active material,
   wherein the other of the pair of external electrodes connected to the second internal electrode includes a negative electrode active material.

4. The all solid battery as claimed in claim 1, wherein each of first internal electrodes including a positive electrode active material and a negative electrode active material and each of second internal electrodes including a positive electrode active material and a negative electrode active material are alternately exposed to the two side faces of the multilayer chip,
   wherein the pair of external electrodes includes a positive electrode active material and a negative electrode active material.

5. The all solid battery as claimed in claim 1, wherein each of first internal electrodes including a positive electrode active material and a negative electrode active material and each of second internal electrodes including a positive electrode active material and a negative electrode active material are alternately exposed to the two side faces of the multilayer chip,
   wherein one of the pair of external electrodes connected to the first internal electrodes includes one of a positive electrode active material and a negative electrode active material,
   wherein the other of the pair of external electrodes connected to the second internal electrode includes the other of the positive electrode active material and the negative electrode active material.

6. The all solid battery as claimed in claim 1, wherein the at least one of the pair of external electrodes include solid electrolyte together with the electrode active material.

7. The all solid battery as claimed in claim 5, wherein the solid electrolyte of the at least one of the pair of external electrodes has a same crystal structure as the solid electrolyte of the solid electrolyte layer.

8. The all solid battery as claimed in claim 6, wherein the solid electrolyte of the at least one of the pair of external electrodes and the solid electrolyte of the plurality of solid electrolyte layers have a NASICON structure.

9. The all solid battery as claimed in claim 1, wherein the pair of external electrodes include a carbon material, a metal material or an alloy material, as a conductive auxiliary material.

10. The all solid battery as claimed in claim 1, wherein the electrode active material of the pair of external electrodes includes a same metal component elements as at least one metal component element of the multilayer chip,
    wherein a concentration of the same metal component elements gradually decreases from inside of the multilayer chip to inside of at least one of the pair of external electrodes.

11. The all solid battery as claimed in claim 10, wherein the electrode active material of the pair of external electrodes is an electrode active material having a same metal component elements as at least one of the metal component elements of the plurality of internal electrode layers.

12. The all solid battery as claimed in claim 11, wherein a concentration of the same metal component element of an external surface of the at least one of the pair of external electrodes is smaller than the concentration of the same metal component element at an interface of the at least one of the pair of external electrodes and the multilayer chip,
    wherein a plated layer is provided on the external surface.

13. An all solid battery comprising:
    a multilayer chip in which each of a plurality of solid electrolyte layers including solid electrolyte and each of a plurality of internal electrodes including an electrode active material are alternately stacked, the multilayer chip having a rectangular parallelepiped shape, the plurality of internal electrodes being alternately exposed to two side faces of the multilayer chip other than two end faces of a stacking direction of the multilayer chip; and a pair of external electrodes that contacts the two side faces, wherein at least one of the pair of external electrodes generates cell capacity during discharge and charge.

\* \* \* \* \*